US011340420B2

(12) United States Patent
Matsuhisa et al.

(10) Patent No.: US 11,340,420 B2
(45) Date of Patent: May 24, 2022

(54) LENS DRIVING DEVICE

(71) Applicant: NIDEC COPAL CORPORATION, Tokyo (JP)

(72) Inventors: Haruka Matsuhisa, Tokyo (JP); Yusuke Ehara, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 175 days.

(21) Appl. No.: 16/497,860

(22) PCT Filed: Mar. 19, 2018

(86) PCT No.: PCT/JP2018/010752
§ 371 (c)(1),
(2) Date: Sep. 26, 2019

(87) PCT Pub. No.: WO2018/180682
PCT Pub. Date: Oct. 4, 2018

(65) Prior Publication Data
US 2020/0049940 A1 Feb. 13, 2020

(30) Foreign Application Priority Data
Mar. 31, 2017 (JP) .............................. JP2017-072591

(51) Int. Cl.
*G02B 7/04* (2021.01)
*G03B 3/10* (2021.01)
(Continued)

(52) U.S. Cl.
CPC ............. *G02B 7/04* (2013.01); *G02B 13/001* (2013.01); *G02B 27/646* (2013.01); *G03B 3/10* (2013.01);
(Continued)

(58) Field of Classification Search
CPC ...... G02B 13/001; G02B 7/04; G02B 27/646; G03B 3/10; G03B 2205/0007; G03B 2205/0069; G03B 5/00
See application file for complete search history.

(56) References Cited

U.S. PATENT DOCUMENTS 7,514,643 B1* 4/2009 Tittle ................... H01H 13/023
200/314
2013/0194683 A1* 8/2013 Machida .................. G02B 7/04
359/814
2018/0136435 A1* 5/2018 Kuo ......................... G02B 7/08

FOREIGN PATENT DOCUMENTS

JP 2015-55776 A 3/2015
JP 2016-14701 A 1/2016
(Continued)

OTHER PUBLICATIONS

International Search Report issued in corresponding International Application No. PCT/JP2018/010752 dated Jun. 19, 2018.

*Primary Examiner* — Cara E Rakowski
(74) *Attorney, Agent, or Firm* — Troutman Pepper Hamilton Sanders LLP

(57) ABSTRACT

A lens driving device having a movable frame on which a magnet is secured, supporting the lens; a base member supporting the movable frame movably; and a cover member, equipped with an opening enabling light to be incident into the lens, covering the movable frame and a supporting face of the base member, wherein: either a coil or a position sensor that faces a magnet is provided on the supporting face of the base member. The other, either the position sensor or the coil that faces the magnet, is provided on a supporting face of the cover member, and an interconnection member that is connected to the coil or the position sensor that is provided on the cover member is formed integrally with the cover member.

8 Claims, 6 Drawing Sheets

(51) Int. Cl.
*G02B 27/64* (2006.01)
*G02B 13/00* (2006.01)
*G03B 30/00* (2021.01)

(52) U.S. Cl.
CPC ...... *G03B 30/00* (2021.01); *G03B 2205/0007* (2013.01)

(56) References Cited

FOREIGN PATENT DOCUMENTS

| | | |
|---|---|---|
| JP | 2016-118755 A | 6/2016 |
| JP | 3206888 U | 10/2016 |
| JP | 2013-156432 A | 8/2018 |
| WO | 2015/016002 A1 | 3/2017 |

\* cited by examiner

LENS DRIVING DEVICE

CROSS-REFERENCE TO RELATED APPLICATIONS

This application is a National Stage application of International Application No. PCT/JP2018/010752 filed Mar. 19, 2018 which claims priority to Japanese Patent Application No. 2017-072591 Mar. 31, 2017. All of the above are incorporated by reference in their entirety.

FIELD OF TECHNOLOGY

The present invention relates to a lens driving device.

BACKGROUND

In a lens driving device, the lens is supported on a movable frame, and the movable frame is supported so as to be able to move on a base member, where either a magnet or a coil is secured to the movable frame and the other, a coil or a magnet, is secured to the base member, to move the movable frame in relation to the base member through an electromagnetic driving force that is produced between the magnet and the coil, to perform autofocusing (AF) or to correct camera shaking (OIS: optical image stabilization), and the like.

In such a lens driving device, when the coil is secured to the movable frame, it is necessary to apply an electric current to a coil that is moving, and thus the springs (leaf springs), wires, or the like, which support the movable frame so as to enable movement, are used as the electrically conductive path. Moreover, when it is the magnet that is secured to the movable frame, feedback control of the state of movement of the movable frame is possible through detecting, through a position sensor (a Hall element, or the like) that is provided on the base member side, the change in magnetic field by the magnet that is moving (referencing Japanese Unexamined Patent Application Publication 2016-14701).

SUMMARY

In the prior art described above, when driving, through applying an electric current to a coil that is secured to the base member, a movable frame to which a magnet is secured, the application of the electric current to the coil is carried out through interconnections provided on the base member. At this time, when detecting, through the position sensor, the position of the movable frame to which the magnet is secured, it is necessary to provide both the coil and the position sensor on the base member, and necessary to provide, on the base member, complex interconnections by which to make these connections.

In recent years, miniaturized mobile electronic devices that have camera functions have become ubiquitous, but it has become imperative that the support area in the base member, for the lens driving device that is mounted thereon, be made smaller. Because of this, when both the coil and the position sensor are disposed on the base member, there is a problem in that it becomes impossible to accommodate the strong needs for miniaturization, or response is through miniaturization through removing some of the coils or position sensors, leading to a problem in that the driving performance or accuracy of control suffers.

The present invention is proposed in order to handle problems such as these. That is, the object is to enable high driving performance and control performance in the lens driving device while adequately responding to the need for miniaturizing the lens driving device, simplifying the interconnections in the base member, simplifying the connections between the interconnection terminals and the circuit board, and the like.

In order to achieve the objects as this, the lens driving device according to the present invention is equipped with the following structures:

A lens driving device including a movable frame on which a magnet is secured, for supporting the lens; a base member for supporting the movable frame movably; and a cover member, equipped with an opening for enabling light to be incident into the lens, covering the movable frame and the face of the base member that supports the movable frame, wherein: a position sensor that faces the magnet is provided on the supporting face of the cover member; and an interconnection that is connected to the position sensor that is provided on the cover member is formed integrally with the cover member.

BRIEF DESCRIPTIONS OF THE DRAWINGS

FIG. 6 (b) is an explanatory diagram of a mobile electronic device (mobile information terminal) equipped with the lens driving device.

DETAILED DESCRIPTION

Figure 1:
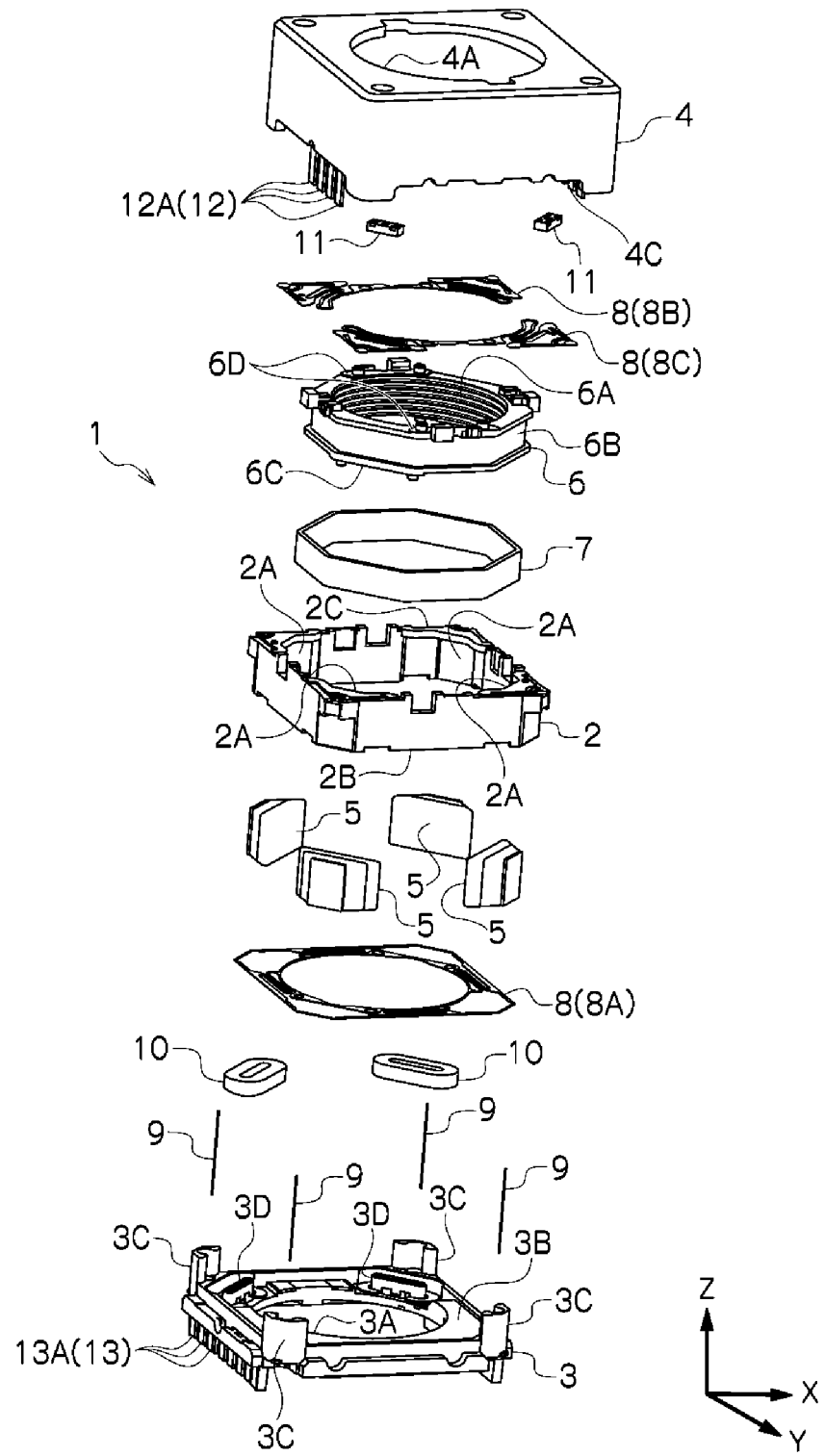
FIG. 1 is a blowup perspective diagram illustrating the overall structure of a lens driving device according to an embodiment according to the present invention.
Figure 2A:
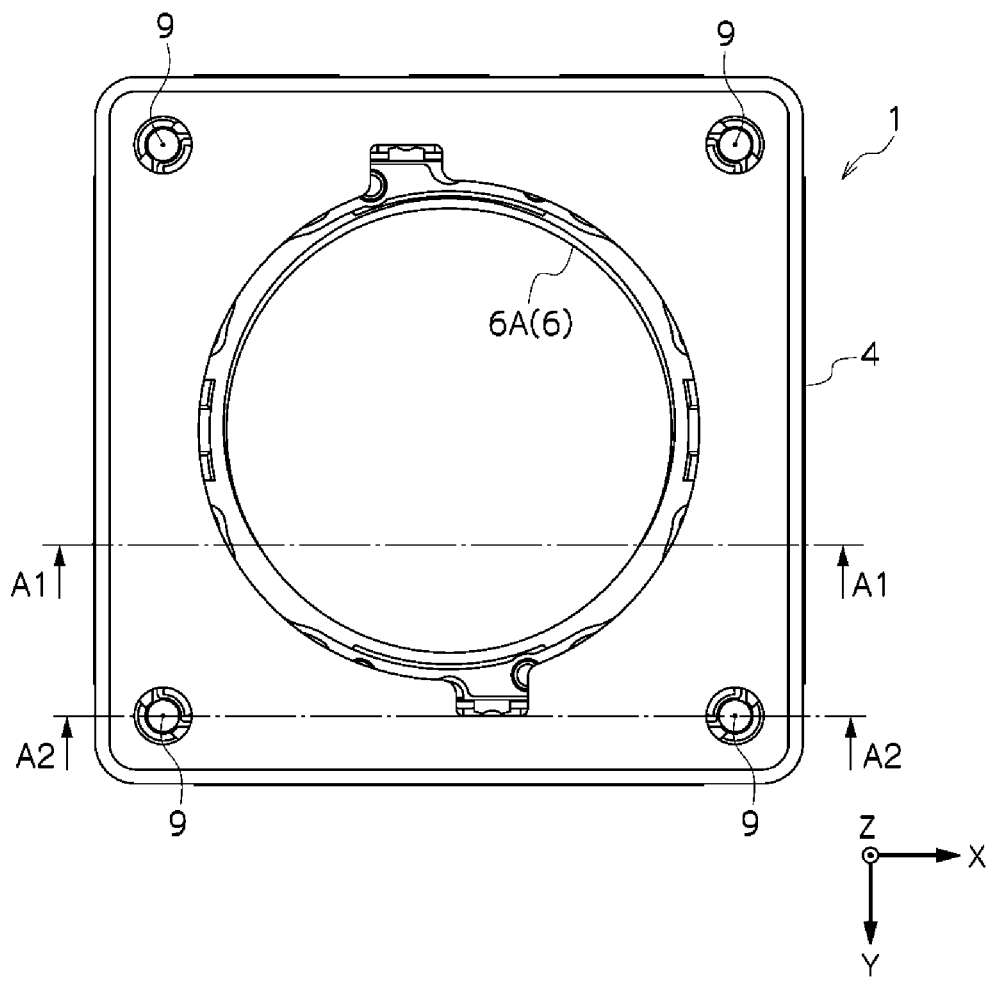
FIG. 2(a) is a plan view of an assembly diagram of the lens driving device according to the embodiment according to the present invention
Figure 2B:
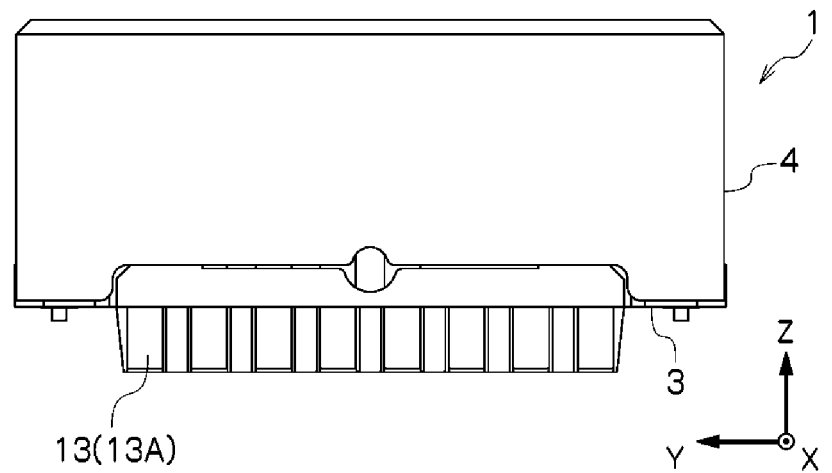
FIG. 2(b) is a side view an assembly diagram of the lens driving device according to the embodiment according to the present invention.
Figure 3A:
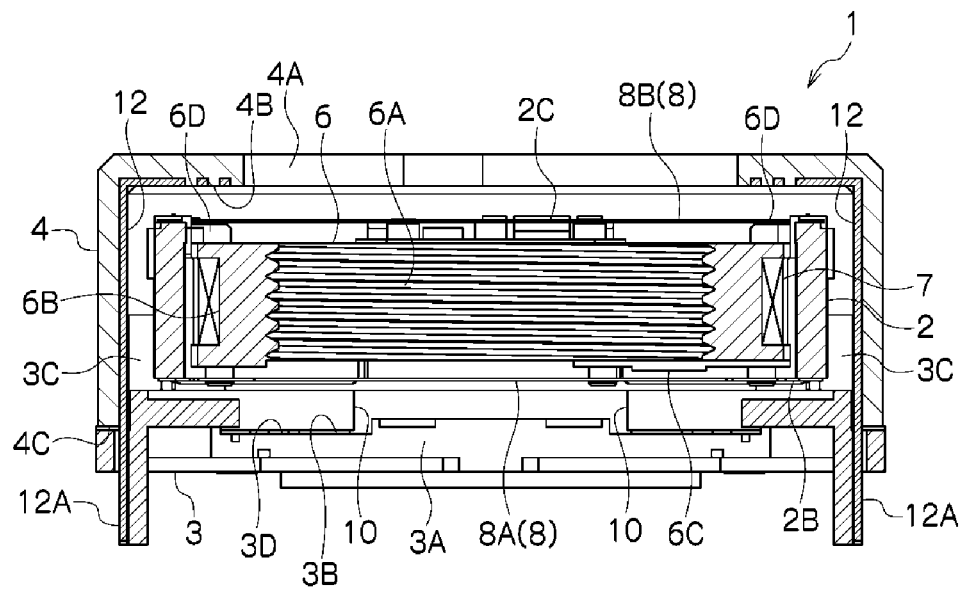
FIG. 3(a) is a cross-sectional drawing of the section A1-A1 in FIGS. 2 (a)
Figure 3B:
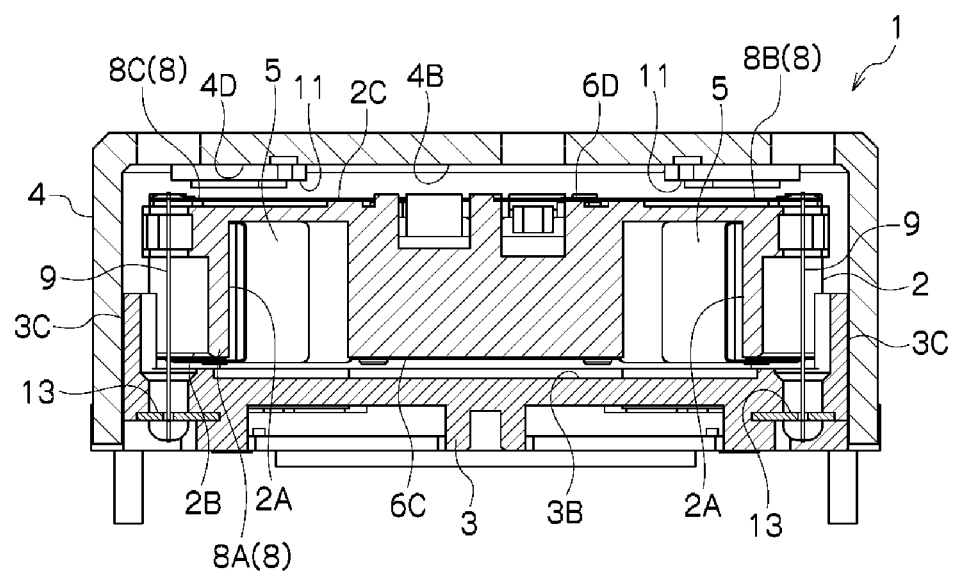
FIG. 3(b) is a cross-sectional drawing of the section A2-A2 in FIG. 2 (a).

Embodiments according to the present invention will be explained below in reference to the drawings. In the descriptions below, identical reference symbols in the different drawings below indicate positions with identical functions, and redundant explanations in the various drawings are omitted as appropriate. The X-Y directions in the figures indicate directions that are perpendicular to the optical axis of the lens, and the Z direction indicates the optical axial direction of the lens, not shown.

As depicted in FIG. 1 through FIG. 5, the lens driving device 1 comprises: a movable frame 2 for supporting the lens, not shown; a base member 3 for supporting the movable frame 2 movably; and a cover member 4 for covering the movable frame 2 and a supporting face 3B of the base member 3.

A plurality of magnets 5 is secured to the movable frame 2. In the example in the figure, the movable frame 2 is a cylindrical member that has an outer edge that is rectangular in the plan view, equipped with magnet retaining portions 2A for holding the magnets 5 within the corner portions thereof.

The lens frame 6 is supported, so as to be able to move, on the movable frame 2. The lens frame 6 is a round cylindrical member equipped with a threaded portion 6A to which a lens barrel, not shown, attaches, and a focusing coil 7 is wound onto a coil retaining portion 6B that is provided on the outer periphery thereof. The lens frame 6 is disposed on the inside of the movable frame 2, which is a cylindrical member, and a magnetic gap is formed between the focusing coil 7 and the magnets 5 that are secured on the movable frame 2.

The lens frame 6 is supported, by leaf springs 8, so as to enable movement along the optical axial direction (the Z direction in the figures). The leaf springs 8 comprise a bottom leaf spring 8A that connects elastically the bottom end portion 6C of the lens frame 6 and the bottom end portion 2B of the movable frame 2, and top leaf springs 8B and 8C that connect elastically the top end portion 6D of the lens frame 6 and the top end portion 2C of the movable frame 2. The top springs 8B and 8C are configured through two members with left/right symmetry.

The movable frame 2 is supported, through a supporting wire 9, on the base member 3 so as to be able to move. The base member 3 has an opening 3A, and is provided with a supporting face 3B that extends along the X-Y plane around the opening 3A.

The supporting wire 9 is provided extending in the Z direction in the figure (the optical axial direction), with one end secured on the base member 3 side (to an interconnecting member that is provided on the base member 3), and the other end secured to the movable frame 2 side (to the top leaf spring 8B or 8C that is secured to the movable frame 2). Through this, the movable frame 2 is supported, suspended by the supporting wire 9, supported so as to enable movement in the X-Y directions (the directions that are perpendicular to the optical axis) through flexing of the supporting wire 9. In the example in the figure, a plurality of supporting wires 9 are provided (4 wires), with one end of a supporting wire 9 secured to each of the four corners of the base member 3, which has outer edges that are a rectangle in the plan view, and stoppers 3C, for limiting the range of movement of the movable frame 2, are provided to the outside thereof.

In the example in the figure, the movable frame 2 is supported so as to enable movement in the X-Y directions in respect to the base member 3, where the lens frame 6 is supported so as to enable movement in the Z direction in respect to the movable frame 2; however, there is no limitation thereto, but instead the lens frame 6 or the lens (lens barrel) itself may be secured to the movable frame 2, and the movable frame 2 may be supported so as to enable movement in the X-Y directions, or in the Z direction, in respect to the base member 3.

Additionally, a coil 10, for driving, is provided on the base member 3, and a position sensor 11 is provided on the cover member 4. In the explanation below, the explanation will be for an example wherein the coil 10 is provided on the base member 3; however, the position of the coil 10 may be set arbitrarily as appropriate depending on the driving method.

Figure 4:
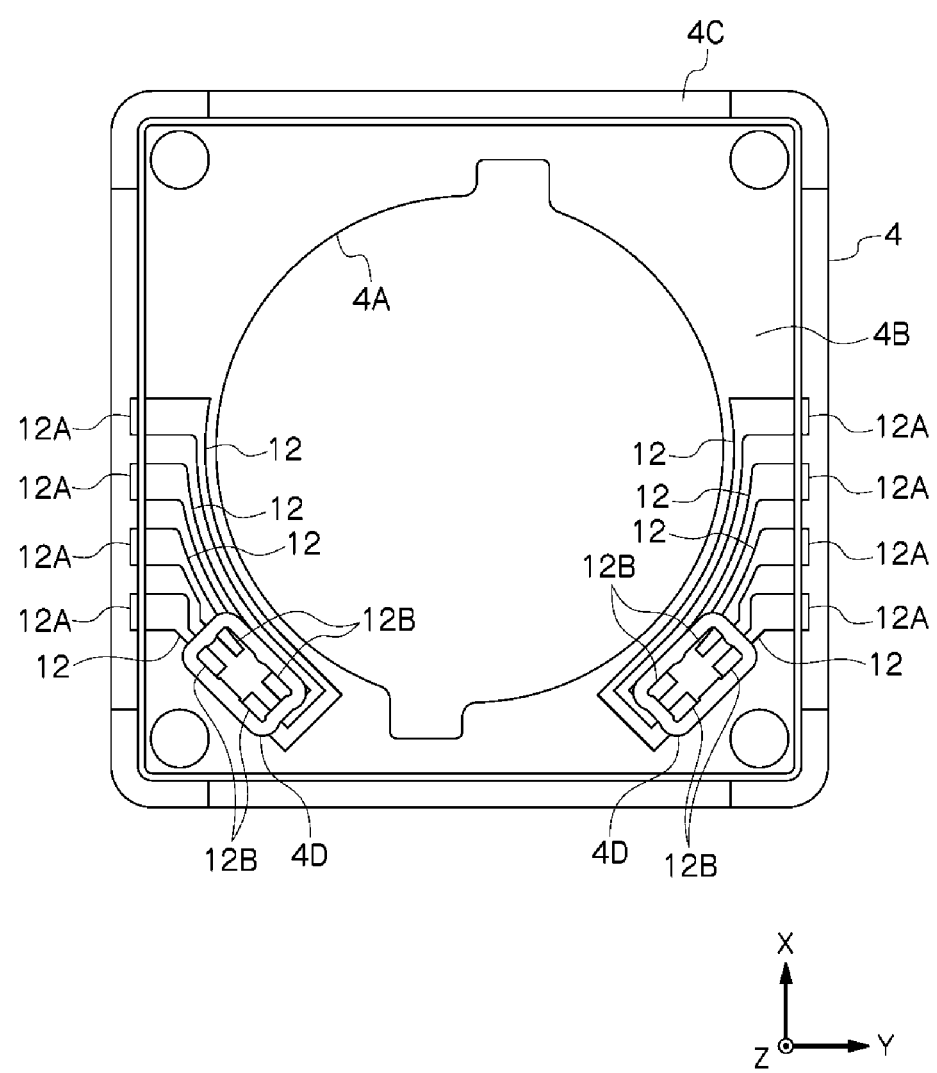
FIG. 4 is a rear view of the cover member.

The cover member 4, as illustrated in FIG. 4, has an opening 4A, by which light is incident onto the lens, not shown, and has a supporting face 4B, on the periphery of the opening 4A, or on the side faces. This cover member 4 is disposed so as to encompass the lens frame 6, the movable frame 2, and of the supporting face 3B of the base member 3, and a base end portion 4C thereof is supported on an outer peripheral portion of the base member 3.

The cover member 4 is provided with a sensor supporting portion 4D for supporting the position sensor 11 on the supporting face 4B. Additionally, the cover member 4 is equipped with an interconnecting member 12. The interconnecting member 12 is, for example, a lead frame, and is molded integrally (through insertion molding) with the cover member 4, which is made from resin. The position sensor 11 that is supported on the sensor supporting portion 4D of the cover member 4, in the example in the figure, is arranged so that two position sensors 11 face in mutually differing directions. The position sensors 11 that are supported on the sensor supporting portion 4D of the cover member 4 may be provided in an arbitrary number thereof, depending on the control method, the number of drive axes, and the like.

One end side of the interconnecting member 12 is an end portion 12A, where the end portion 12A leads out from the base end portion 4C of the cover member 4, to serve as a connecting terminal for a circuit board. Additionally, the other end side of the interconnecting member 12 is a terminal portion 12B that is provided on the sensor supporting portion 4D, where the terminal portion 12B is connected to a terminal of a position sensor 11. The interconnecting member 12 is not limited to being a lead frame, but rather any of a variety of interconnection structures may be used; for example, it may be formed through an MID (molded interconnect device) technology.

Figure 5:
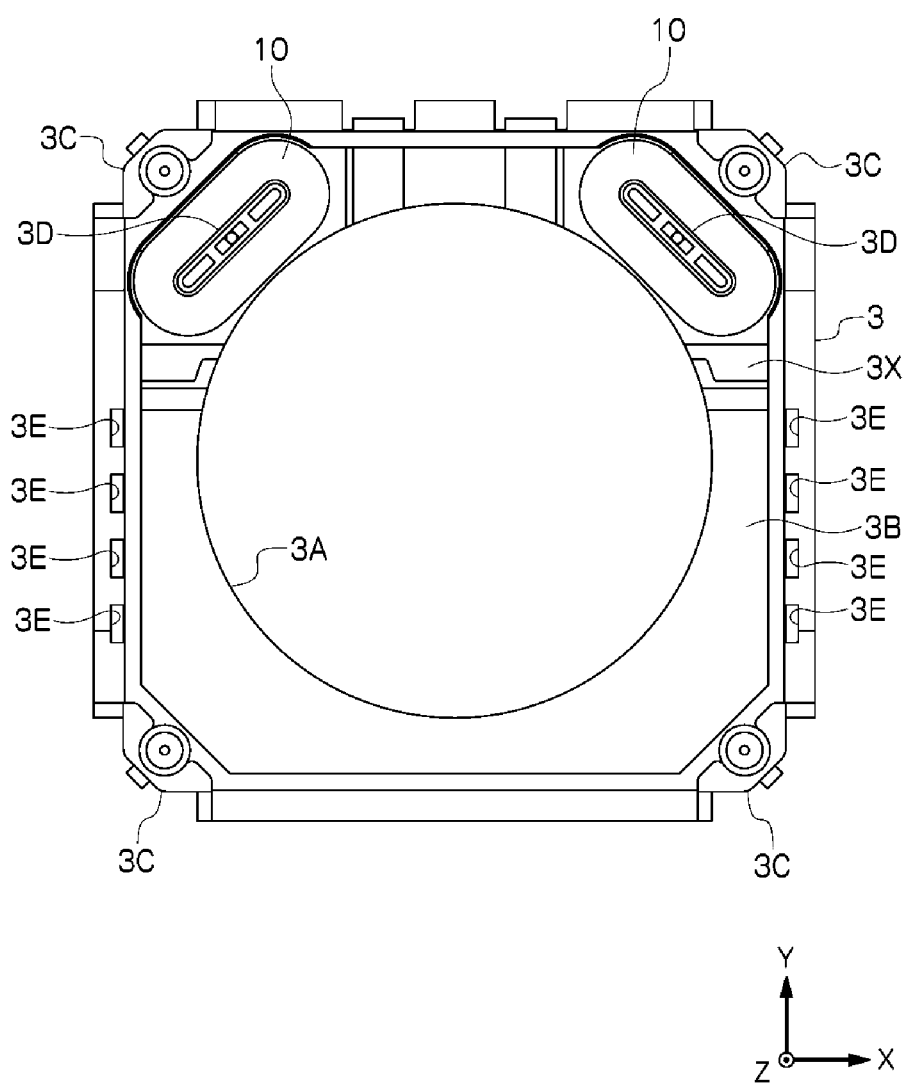
FIG. 5 is a plan view of the base member.

As illustrated in FIG. 5, in the base member 3, a coil supporting portion 3D is provided on the supporting face 3B, and the coil 10 is attached to this coil supporting portion 3D. In the example in the figure, two coils 10 wherein the linear parts thereof face in crossing directions, are disposed on the supporting face 3B; however, there is no limitation thereto, but rather four coils 10 may instead be provided, with the linear parts of adjacent coils 10 facing in mutually differing directions.

In that the base member 3, an interconnecting member 13 is provided, connected to the coil 10. The interconnecting member 13 is, for example, a lead frame, and is molded integrally (through insertion molding) with the base member 3, which is made from resin. One end side of the interconnecting member 13 is an end portion 13A, where the end portion 13A leads out from the peripheral edge of the base member 3, to serve as a connecting terminal for a circuit board. Additionally, the other end side of the interconnecting member 13 is a terminal portion 3X that is provided on the lead frame, with one of the lead wires of the coil 10 connected thereto. Note that a terminal portion 3X is provided on the back face side, not illustrated, as well, and the other lead wire of the coil 10 is connected thereto. The interconnecting member 13, like the interconnecting member 12, is not limited to being a lead frame, but rather any of a variety of interconnection structures may be used; for example, it may be formed through an MID (molded interconnect device) technology.

In the example in the figure, the supporting face 3B of the base member 3 and the supporting face 4B of the cover member 4 are arranged facing each other along the directions that are perpendicular to the optical axis of the lens, and the magnets 5, which are secured to the movable frame 2, are disposed therebetween. Given this, the magnets 5 have first opposing faces (bottom faces) that face the coil 10, through facing the supporting face 3B of the base member 3, and second opposing faces (top faces) that face the position sensor 11, through facing the supporting face 4B of the cover member 4.

In the lens driving device 1 in the figure, the movable frame 2 is supported so as to be able to move, in respect to the base member 3, along the directions that are perpendicular to the optical axis of the lens (the X-Y directions), and the lens frame 6 is supported on the movable frame 2 so as to be able to move along the optical axial direction of the lens (the Z direction), to enable movement of the movable frame 2 in the X-Y directions through application of electric currents to the coils 10, and movement of the lens frame 6 in the Z direction through application of an electric current to the focusing coil 7.

The application of the electric current to the coil 10 is carried out through the interconnecting member 13 that is provided on the base member 3, where, for the movement of the movable frame 2 in the X-Y directions, the movement of the magnets 5 that are secured to the movable frame 2 is detected by the position sensors 11 that are provided on the cover member 4, where the detection signals are outputted to an external circuit board through the interconnecting member 12 that is provided on the cover member 4. Additionally, the application of electric power to the focusing coil 7 is through connecting the pair of lead wires of the focusing coil 7 to the respective top leaf springs 8B and 8C, and applying electric power through the supporting wire 9 and the top leaf springs 8B and 8C from the interconnecting members that are provided in the base member 3.

The end portion 12A of the interconnecting member 12 that is provided on the cover member 4 is inserted into an insertion hole 3E, which is provided at a peripheral edge portion, through the base end portion 4C of the cover member 4 being supported by the peripheral edge portion of the base member 3. Through this, the end portion 12A of the interconnecting member 12 structures a connecting terminal that connects to the outside circuit board together with the end portion 13A of the interconnecting member 13 that is provided on the base member 3.

In such a lens driving device 1, the position sensors 11 that face the magnets 5 are provided on the supporting face 4B of the cover member 4, and the interconnecting member 12 that is connected to the position sensors 11 is formed integrally with the cover member 4, thus eliminating the need for providing a space, on the base member 3, for placement of both the coil 10 and the position sensors 11, making it possible to reduce the space taken by the base member 3, thereby enabling miniaturization of the lens driving device 1. Additionally, because coils 10 and position sensors 11 that are sufficient for ensuring driving performance can be placed on the base member 3 of the reduced size, this makes it possible to achieve a high-performance lens driving device 1 while still being small.

Furthermore, because the interconnecting member 13 for connecting to the coils 10, and the interconnecting member 12 for connecting to the position sensors 11, are provided divided onto the base member 3 and the cover member 4, this can simplify the interconnection structure in the base member 3, enabling simplification of the connections between the interconnection end portions in the circuit board through placement by combining together the end portion 12A of the interconnecting member 12 that is provided on the cover member 4 and the end portion 13A of the interconnecting member 13 that is provided on the base member 3.

Figure 6A:
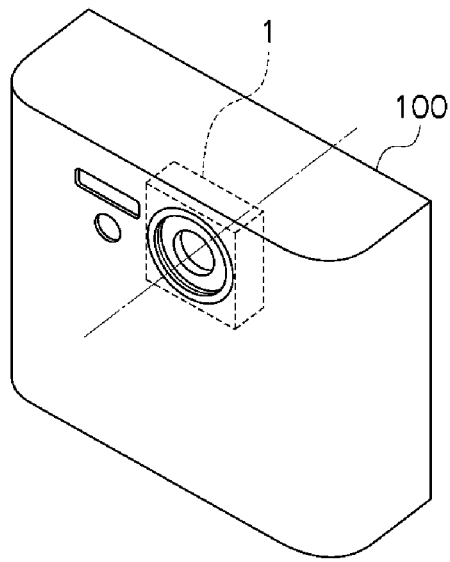
FIG. 6 (a) is an explanatory diagram of an imaging device comprising the lens driving device.
Figure 6B:
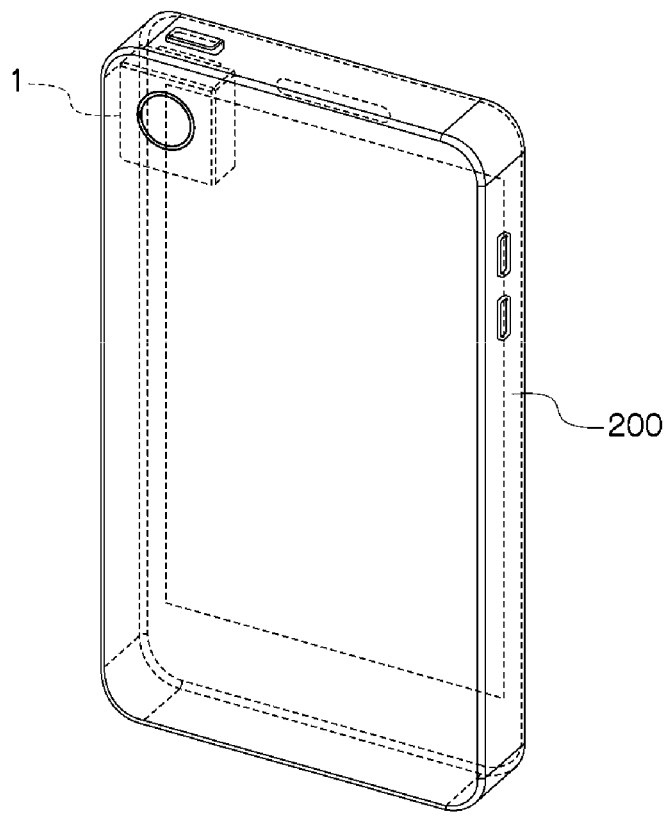

Such a lens driving device 1 may be equipped in an imaging device 100 as depicted in FIG. 6 (*a*), enabling miniaturization of the imaging device 100 itself, and making it possible to achieve high autofocus performance and camera stabilization performance. Moreover, it can be built into a camera unit such as a mobile electronic device (mobile information terminal) 200, as depicted in FIG. 6 (*b*). The installation of the lens driving device 1, with its reduced installation space and its high-performance, in such a mobile electronic device 200 makes it possible to not only improve the functionality of the imaging function, but also to secure internal space for improved functionality of other functions as well, and also making it possible to achieve enhanced mobility through reduced size and thickness.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:

1. A lens driving device comprising:
a magnet;
a movable frame on which the magnet is secured, supporting a lens;
a base member supporting the movable frame movably; and
a cover member, covering the movable frame and a supporting face of the base member, equipped with an opening causing light to be incident on the lens, wherein:
a position sensor that faces the magnet is provided on a supporting face of the cover member;
an interconnection that is connected to the position sensor that is provided on the cover member is formed integrally with the cover member; and
an interconnection end portion provided at a base end portion of the cover member.

2. The lens driving device as set forth in claim 1, wherein:
the supporting face of the base member and the supporting face of the cover member are disposed facing each other and oriented along a direction that is perpendicular to the optical axis of the lens;
a coil is disposed on the supporting face of the base member; and
the magnet faces the supporting face of the base member and faces the supporting face of the cover member.

3. The lens driving device as set forth in claim 1, wherein:
the interconnection is formed through an MID technology.

4. The lens driving device as set forth in claim 1, wherein:
the movable frame is supported so as to be able to move, in respect to the base member, along a direction that crosses the optical axis of the lens.

5. The lens driving device as set forth in claim 1, wherein:
the movable frame is supported so as to be able to move, in respect to the base member, along the optical axis of the lens.

6. The lens driving device as set forth in claim 1, wherein:
the movable frame is supported so as to enable movement, in respect to the base member, along a direction that is perpendicular to the optical axis of the lens, and a lens frame is supported, in the movable frame, so as to enable movement along the optical axial direction of the lens.

7. An imaging device comprising a lens driving device as set forth in claim 1.

8. A mobile electronic device equipped with a lens driving device as set forth in claim 1.

* * * * *